United States Patent [19]
McFall

[11] 4,266,879
[45] May 12, 1981

[54] FLUID RESONATOR

[76] Inventor: Richard T. McFall, 2230 Pine St., Philadelphia, Pa. 19103

[21] Appl. No.: 541,549

[22] Filed: Jan. 16, 1975

[51] Int. Cl.³ .............................................. B01F 11/00
[52] U.S. Cl. .................................... 366/108; 366/336
[58] Field of Search ........................ 48/180 M, 180 B; 116/137 A; 138/40, 42, 43, 44, 45; 166/177, 249, 311, 312; 259/4 R, 4 AB, DIG. 43, DIG. 44, 4 AC, 1 R; 137/829; 239/102; 366/108, 124, 336, 348

[56] References Cited
U.S. PATENT DOCUMENTS

| | | | |
|---|---|---|---|
| 3,232,267 | 2/1966 | Hughes | 116/137 A |
| 3,520,362 | 7/1970 | Galle | 166/249 |
| 3,582,365 | 6/1971 | Lindsey | 259/1 R |

FOREIGN PATENT DOCUMENTS

| | | | |
|---|---|---|---|
| 535259 | 1/1957 | Canada | 259/4 R |
| 1171059 | 1/1959 | France | 259/4 AB |

*Primary Examiner*—Robert W. Jenkins
*Attorney, Agent, or Firm*—Michael F. Petock

[57] ABSTRACT

A fluid resonator is disclosed in which a fluid flow through and around a cylindrical member positioned parallel to the direction of the fluid flow causes vibration or vibratory waves in the fluid flow. The fluid resonator may take on a number of different forms. Preferably, a plurality of cylindrical members may be concentrically positioned in the fluid flow stream. Variations may also be provided in the structure of the cylindrical element to produce desired effects in specific cases. The fluid resonator may be used for many purposes, including emulsification apparatus and the secondary recovery of oil from oil formations.

16 Claims, 10 Drawing Figures

FLUID RESONATOR

The purpose of the above abstract is to provide a non-legal technical statement of the disclosure of the contents of the instant patent application and thus serve as a searching-scanning tool for scientists, engineers and researchers. Accordingly, this abstract is not intended to be used in understanding or otherwise comprehending the principles of the present invention hereinafter described in detail, nor is it intended to be used in interpreting or in any way limiting the scope or fair meaning of the claims appended hereto.

BACKGROUND OF THE INVENTION

The present invention relates to a fluid resonator. More particularly, the present invention relates to a fluid resonator using one or more cylindrical elements mounted parallel to the direction of the fluid flow stream.

The present invention is intended to be used with all types of fluids, including all types of gases, including air, and all types of fluids, including water and mixtures of water and steam.

The prior art in this area, which is known to the inventor herein, primarily relates to the technology of whistles and sirens and ultrasonic transducers as described in a book entitled *Ultrasonic Technology* by Richard G. Goldman, Published by Reinhold Publishing Corp. in 1962. In addition, much work has been done in the field of fluid amplifiers. For example, U.S. Pat. No. 3,503,410—Richards discloses a fluid amplifier mounted in a pipe using cylindrical members. However, the Richards patent does not disclose a fluid resonator, but is directed to a fluid amplifier in which a power jet is directed into one of two or more distinct outlets. The Richards patent is directed to a device in which control is effected through pressure of a secondary fluid rather than through the momentumexchange principle.

One of the more important uses of the present invention is in the secondary recovery of oil from oil formations. When an oil well is originally drilled, a certain amount of oil will usually flow out of the bore hole under its own pressure. When the oil stops flowing out of the oil well under its own pressure, usually about 40–60% of the original oil remains in place. At this point, it is necessary to use some type of a secondary recovery process to get the oil out of the ground.

The present invention is particularly useful in the secondary recovery of oil. The present invention may be mounted within the casing of an oil well bore hole. A fluid medium of steam, hot water, water, or a combination of steam and hot water may be forced under pressure down through the bore hole. The fluid medium may preferably be heated, such as hot water or steam, but any suitable fluid medium such as cold water may be used. Heating of the fluid medium tends to reduce the viscosity of the oil. The present invention provides a vibration effect in the fluid medium. This vibration effect or vibratory motion in the fluid medium tends to cause the oil within the formations, such as sand stone, to be freed and emulsified in the fluid medium. The emulsification is then caused, by the continual forcing of the fluid medium, such as hot water and steam, into the bore hole, to flow up through other bore holes. Vibratory motions of high intensity may be set up in the fluid medium, that is, the hot water and steam, by using concentric cylindrical elements and by cascading cylindrical element groups. This structure will result in an efficient secondary recovery of oil.

In addition, the present invention has numerous other uses. The present invention may be used in any industrial process where it is necessary or desirable to create emulsions. For example, it is necessary to create emulsions in the manufacture of salad dressing. The present invention may also be used to create dispersions. The present invention may find uses in many wide and varied fields including use in fog dispersion and use in causing condensation in clouds resulting in rain. These, of course, would use the fluid medium of air. The present invention may also be used in the construction industry to enable the more efficient flowing of concrete into forms. The present invention may be used in any area where it is desirable to create vibratory waves in a fluid.

SUMMARY OF THE INVENTION

An advantage of the present invention is that the fluid resonator is adapted to be mounted completely within the flow stream.

Another advantage of the present invention is that it provides a maximum power output for a given set of dimensional restrictions.

Another advantage of the present invention is that it is comprised of relatively simple structural elements, and is substantially maintinance-free.

Another advantage of the present invention is that a number of basic elements may be arranged concentrically and in cascade to provide the desired power and frequency ranges required in the particular application of the fluid resonator.

Briefly and basically, the present invention comprises an apparatus for producing vibrations in a fluid flow using at least one cylindrical or tubular member mounted with its longitudinal axis parallel to the direction of fluid flow.

Another embodiment of the present invention includes a plurality of concentrically arranged cylindrical members to form a composite resonator element. Resonator elements may be cascaded in series along the fluid flow stream path. Also, variations may be made in the structure of the resonator members, such as by varying the leading edge and the addition of sections of increasing or decreasing diameter.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

DETAILED DESCRIPTION OF THE PREFERRED EMBODIMENTS

Figure 1:
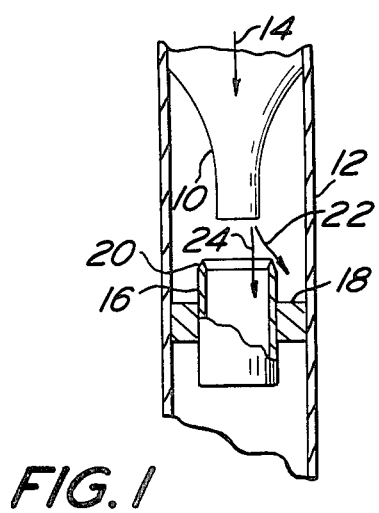
FIG. 1 is a side elevation view, partially in cross section, of one embodiment of the present invention.

Referring now to the drawings in detail, wherein like numerals indicate like elements, there is shown in FIG. 1 a nozzle 10 mounted within a pipe conduit or casing 12. The casing 12 is adapted to carry a fluid flow stream in the direction of arrow 14. The pipe conduit or casing 12 may be a pipe carrying fluid flow in an industrial emulsification process or it may be a casing mounted in an oil well bore hole. A cylindrical or tubular member 16 is mounted with its longitudinal axis parallel to the direction of fluid flow within casing 12 by means of rib members 18. The cylindrical member 16 is preferably provided with a knife edge 20.

The fluid flow from nozzle 10 is provided with a vibration or oscillatory motion after passing through and around cylindrical member 16. Although the theory of operation of the present invention has not been proven, it is believed that the fluid flow emanating from the lower end of nozzle 10 is set into vibratory oscillation at the leading edge or knife edge 20 causing the fluid flow to oscillate back and forth across leading edge 20 as shown by arrows 22 and 24. In other words, the fluid flow stream from nozzle 10 may initially be drawn to flow outside of cylindrical member 16 as shown by arrow 22. This may cause pressure differentials causing the flow stream to be drawn back across knife edge or leading edge 20 to flow in the direction of arrow 24. The switching or oscillating across the leading edge 20 may occur at ultrasonic frequencies. This is believed to result in the sonic or ultrasonic vibratory motion which is imparted to the fluid flow. Obviously, the operation of the device is a function of various factors known to those skilled in the art, such as fluid velocity, fluid viscosity and the dimensions of the apparatus. The relationship of these parameters to provide various desired results may be determined by simple experimentation.

Figure 2:
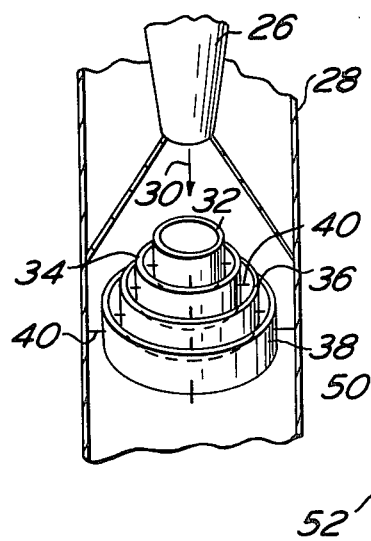
FIG. 2 is a side elevation view, partially in cross section, of another embodiment of the present invention.

Referring now to FIG. 2, there is shown another embodiment of the present invention utilizing nozzle 26 mounted within casing 28. Fluid flow is in the direction of arrow 30. Mounted downstream of nozzle 26 and within casing 28 are a plurality of concentrically positioned cylindrical members 32, 34, 36 and 38. The cylindrical members 32, 34, 36 and 38 are secured by means of rib members 40. It will be apparent to those skilled in the art that more or less than four concentrically arranged cylindrical members may be used. Furthermore, the selection of the diameters of cylindrical members 32 will vary depending upon the specific application.

Figure 3:
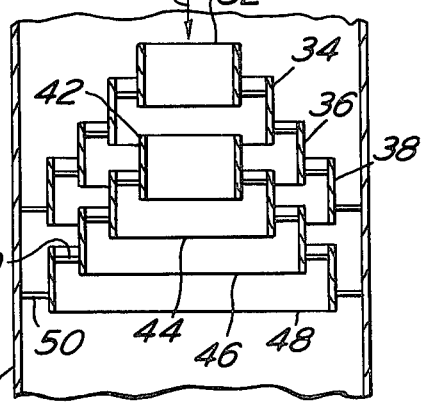
FIG. 3 is a cross-sectional elevation view of another embodiment of the present invention.

Referring now to FIG. 3, there is shown another embodiment of the present invention wherein a second set of concentrically mounted members 42, 44, 46 and 48 are mounted in cascade downstream from the first set of cylindrical members 32, 34, 36 and 38. Cylindrical members 42, 44, 46 and 48 are structurally positioned in place by means of rib members 50 and also mounted to casing 52 by means of rib members 50.

Figure 4:
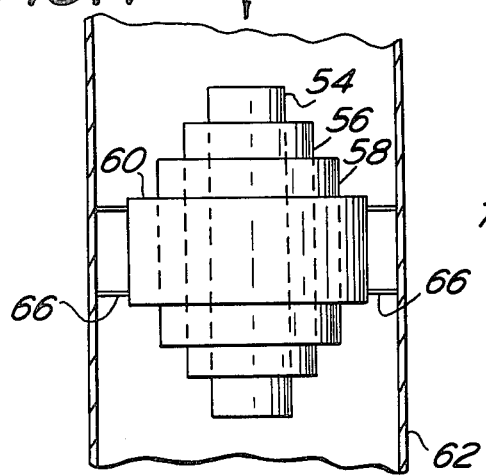
FIG. 4 is an elevation view, partially in cross-section, of another embodiment in accordance with the present invention.

Referring now to FIG. 4, there is shown another embodiment of the present invention wherein cylindrical members 54, 56, 58 and 60 are mounted within casing 62 so that their longitudinal axis is parallel to the direction of fluid flow in the direction of arrow 64. The shortest and outermost cylindrical member 60 is mounted to casing 62 by means of ribs 66.

Figure 5:
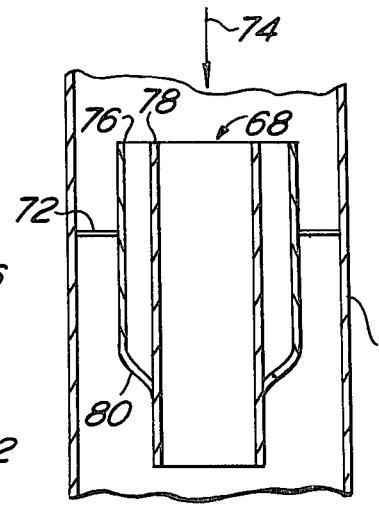
FIG. 5 is an elevation view in cross-section of another embodiment in accordance with the present invention.

Referring now to FIG. 5, there is shown another embodiment of the present invention wherein a cylindrical member 68 is mounted within casing 70 by means of ribs 72 with its longitudinal axis parallel to the direction of the flow stream as indicated by arrow 74. Cylindrical member 68 is provided with double walls 76 and 78. Double walls 76 and 78 are closed together at 80 near the downstream end of the cylindrical member 68. The closed double wall provides significant additional vibration by creating shock waves when the fluid flow hits the closed portion 80 connecting the double walls 76 and 78. The double wall embodiment also increases the intensity of the vibration by sympathetic vibration of the double walls or elements 76 and 78 similar to the effect created by a tuning fork.

Figure 6:
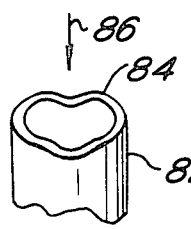
FIG. 6 is a view in perspective of the leading edge of an embodiment of a cylindrical member in accordance with the present invention.
Figure 7:
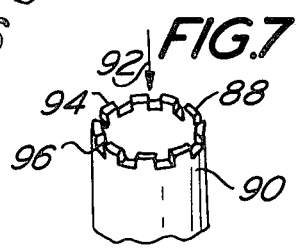
FIG. 7 is a view in perspective of another embodiment of a leading edge in accordance with the present invention.

FIGS. 6 and 7 illustrate modifications to the embodiments of the present invention wherein the leading edges of cylindrical members are provided with variations. FIG. 7 illustrates a cylindrical member 82 provided with a sinusoidal variation 84 in the direction of fluid flow as shown by arrow 86. In other words, the leading edge 84 varies sinusoidally, the amplitude of the sinusoid being in the direction of arrow 86 for abscissa points travelling around the circumference of cylindrical member 82.

FIG. 7 illustrates a block tooth shaped leading edge 88 on cylindrical member 90. It may be more clearly seen from FIG. 7 that the variations in the leading edge will have an additional vibratory effect on the fluid flow. For example, fluid flow in the direction of arrow 92 will first come in contact with the peak 94 of a tooth and, at a slightly later time, come in contact with the lower portion 96 between teeth. This will cause pressures on the teeth causing deformations and deflections of the teeth. This in turn causes additional vibrations in the fluid flow.

Figure 8:
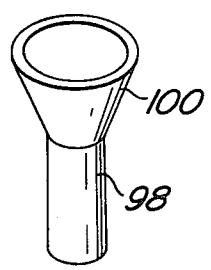
FIG. 8 is a view in perspective of an embodiment of a cylindrical member provided with a section of increasing diameter in accordance with the present invention.

Referring now to FIG. 8, there is shown a cylindrical member 98 provided with a section of increasing diameter 100. The increasing section of the diameter 100 is illustrated as a conical section. However, it is understood that this may be of any other suitable shape, such as an exponentially increasing diameter.

Figure 9:
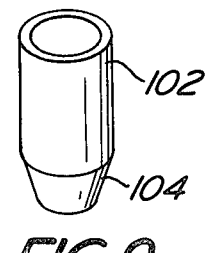
FIG. 9 is a view in perspective of another embodiment of a cylindrical member provided with a section of decreasing diameter in accordance with the present invention.

FIG. 9 illustrates an embodiment wherein a cylindrical member 102 is provided with a section of decreasing diameter 104.

Figure 10:
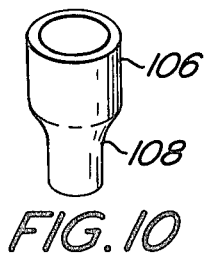
FIG. 10 is a view in perspective of another embodiment of a cylindrical member provided with a section of decreasing diameter in accordance with the present invention.

FIG. 10 illustrates an embodiment of a cylindrical element 106 provided with an exponentially decreasing section 108.

It will be apparent to those skilled in the art that various modifications may be made to the structure of the present invention within the spirit of the teachings of the present invention. For example, with respect to the embodiment of FIG. 3, a large number of groups of concentrically arranged cylindrical members may be used. Furthermore, it is not necessary that the elements be separate and distinct as indicated. For example, the central element may be comprised of a pipe with slits cut through major portions of the sides allowing narrow portions of material to remain for support. Likewise, a similar construction may be used for each of the remaining cylindrical elements. Many other variations are also possible within the scope of the present teachings. For example, a saw tooth shape may be provided on the leading edge of the cylindrical members. Various other types of support structures and various different nozzle structures may be used within the spirit and scope of the present invention.

In view of the above, the present invention may be embodied in other specific forms without departing from the spirit or essential attributes thereof and, accordingly, reference should be made to the appended claims, rather than to the foregoing specification as indicating the scope of the invention.

I claim:

1. Apparatus for producing vibrations in a fluid flow, comprising:
   at least one cylindrical member adapted to be mounted in a fluid flow with its longitudinal axis parallel to the direction of fluid flow, and wherein the leading edge of said cylindrical member varies about its circumference in the direction of the fluid flow path, wherein the variation of the leading edge of said cylindrical member provides a sinusoidal shape.

2. Apparatus for producing vibrations in a fluid flow, comprising:
   at least one cylindrical member adapted to be mounted in the fluid flow with its longitudinal axis parallel to the direction of fluid flow, wherein said cylindrical member is provided with at least a partial double wall and the area between the walls of said double wall being at least partially closed near its downstream end.

3. Apparatus for producing vibrations in a fluid flow, comprising:
   a pipe or conduit for fluid flow;
   a plurality of cylindrical members, each having a leading and trailing edge, mounted in series in the conduit in the fluid flow path with their longitudinal axes parallel to the direction of fluid flow and allowing fluid flow on both sides of the members, and said plurality of cylindrical members being separated from each other by a predetermined distance in the direction of fluid flow such that a separation is provided between the trailing edge of the preceeding cylindrical members and the leading edge of succeeding cylindrical members, a plurality of concentrically mounted cylindrical members, said plurality of concentric cylindrical members varying in length, and means for concentrating and directing fluid with force towards the leading edge of at least the first of said cylindrical members, the leading edge of said cylindrical member undergoing interaction with the fluid flow whereby vibrations are induced in the fluid.

4. Apparatus for producing vibrations in a fluid flow, comprising:
   a pipe or conduit for a fluid flow;
   a plurality of cylindrical members, each having a leading and trailing edge, mounted in series in the conduit in the fluid flow path with their longitudinal axes parallel to the direction of fluid flow and allowing fluid flow on both sides of the members, and said plurality of cylindrical members being separated from each other by a predetermined distance in the direction of fluid flow such that a separation is provided between the trailing edge of preceeding cylindrical members and the leading edge of succeeding cylindrical members, at least one additional cylindrical member mounted concentric with at least one of said plurality of cylindrical members, at least one additional cylindrical member mounted concentrically with another one of said plurality of cylindrical members wherein said two concentrically mounted cylindrical members are mounted in the flow path in series and means for concentrating and directing fluid with force towards the leading edge of at least the first of said cylindrical members, the leading edge of said cylindrical member undergoing interaction with the fluid flow whereby vibrations are induced in the fluid.

5. Apparatus for use in the recovery of oil from oil formations, comprising:
   at least one cylindrical member mounted concentrically within an oil well bore hole casing or equivalent structure in an oil well bore hole with its longitudinal axis parallel to the direction of the fluid flow and allowing fluid flow on both sides of said member, the leading edge of said cylindrical member interacting with the fluid flow for producing vibration in the fluid flow through the bore hole.

6. Apparatus for use in the recovery of oil in accordance with claim 5 wherein said cylindrical member is provided with a knife edge on its leading edge.

7. Apparatus for use in the recovery of oil in accordance with claim 5 including at least one additional cylindrical member mounted concentric with said at least one cylindrical member.

8. Apparatus for use in the recovery of oil in accordance with claim 7 including at least one additional group of at least two additional concentrically mounted cylindrical members mounted in the flow path in series with said previously recited cylindrical members.

9. Apparatus for use in the recovery of oil in accordance with claim 5 including a nozzle for directing the fluid flow towards the leading edge of said cylindrical member.

10. Apparatus for use in the recovery of oil in accordance with claim 5 wherein the leading edge of said cylindrical member is provided with a sinusoidal shape.

11. Apparatus for use in the recovery of oil in accordance with claim 5 wherein the leading edge of said cylindrical member is provided with a tooth shape.

12. Apparatus for use in the recovery of oil in accordance with claim 5 wherein said cylindrical member is provided with a section of increasing diameter.

13. Apparatus for use in the recovery of oil in accordance with claim 5 wherein said cylindrical member is provided with a section of decreasing diameter.

14. Apparatus for use in the recovery of oil in accordance with claim 5 wherein said cylindrical member is provided with at least a partial double wall and the area between the walls of said double wall being at least partially closed near its downstream end.

15. Apparatus for use in the recovery of oil in accordance with claim 5 including a plurality of concentrically mounted cylindrical members, said plurality of concentric members varying in length.

16. Apparatus for use in the recovery of oil in accordance with claim 5 wherein the leading edge of said cylindrical member varies about its circumference in the direction of the fluid flow path.

* * * * *